March 29, 1938.  F. KRUEGER  2,112,536
CAN TESTING MACHINE
Filed April 25, 1935  9 Sheets-Sheet 1

INVENTOR
Frank Krueger,
BY
Fraser, Myers & Manley
ATTORNEYS.

March 29, 1938.  F. KRUEGER  2,112,536
CAN TESTING MACHINE
Filed April 25, 1935  9 Sheets-Sheet 3

INVENTOR
Frank Krueger,
BY
Mauer, Myers & Manley
ATTORNEY

March 29, 1938.　　　F. KRUEGER　　　2,112,536
CAN TESTING MACHINE
Filed April 25, 1935　　　9 Sheets-Sheet 5

INVENTOR
Frank Krueger,
BY
Fraser, Myers & Manley
ATTORNEYS.

March 29, 1938.  F. KRUEGER  2,112,536
CAN TESTING MACHINE
Filed April 25, 1935  9 Sheets-Sheet 6
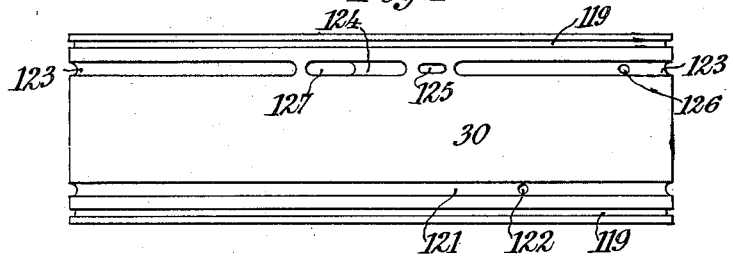
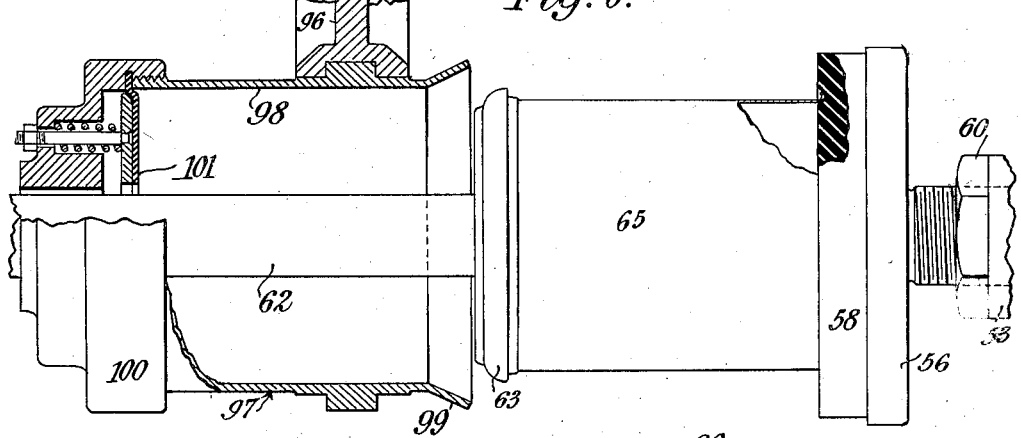
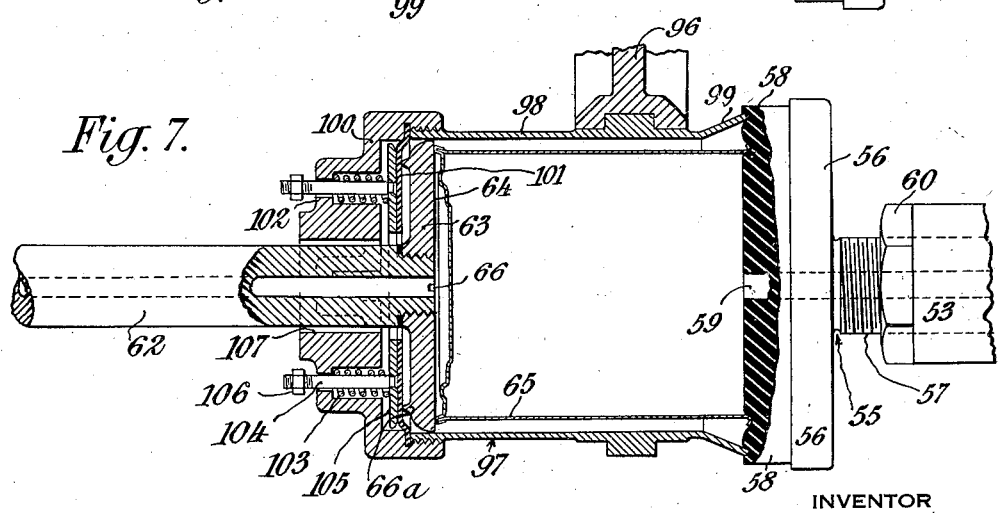
INVENTOR
Frank Krueger,
BY
Fraser, Myers & Manley
ATTORNEYS.

March 29, 1938.　　　F. KRUEGER　　　2,112,536
CAN TESTING MACHINE
Filed April 25, 1935　　　9 Sheets-Sheet 7
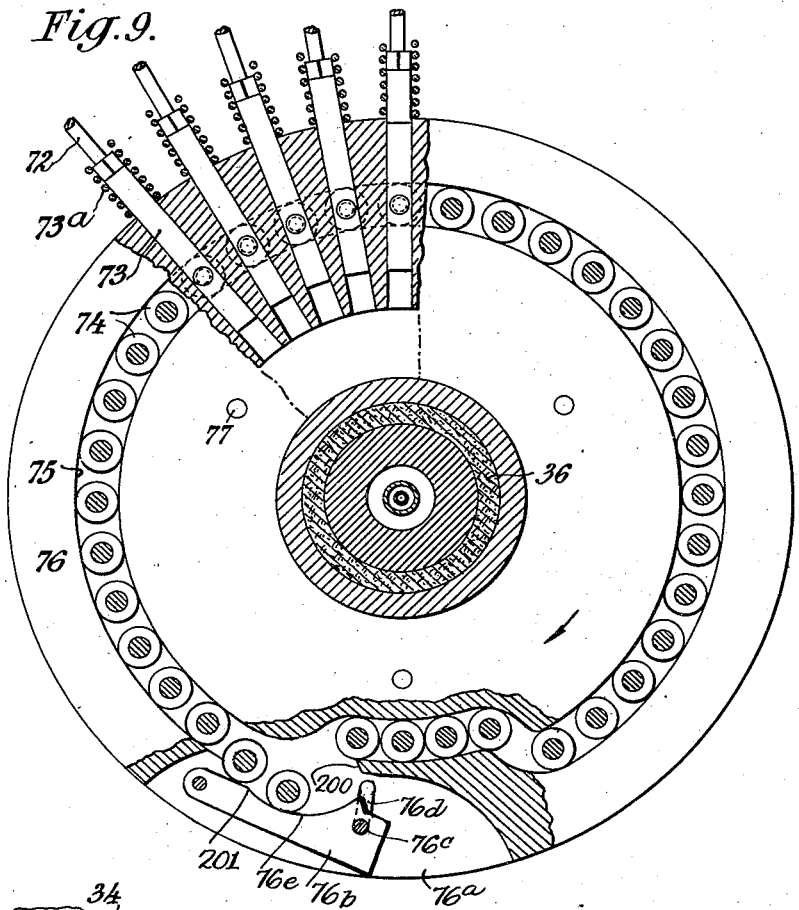
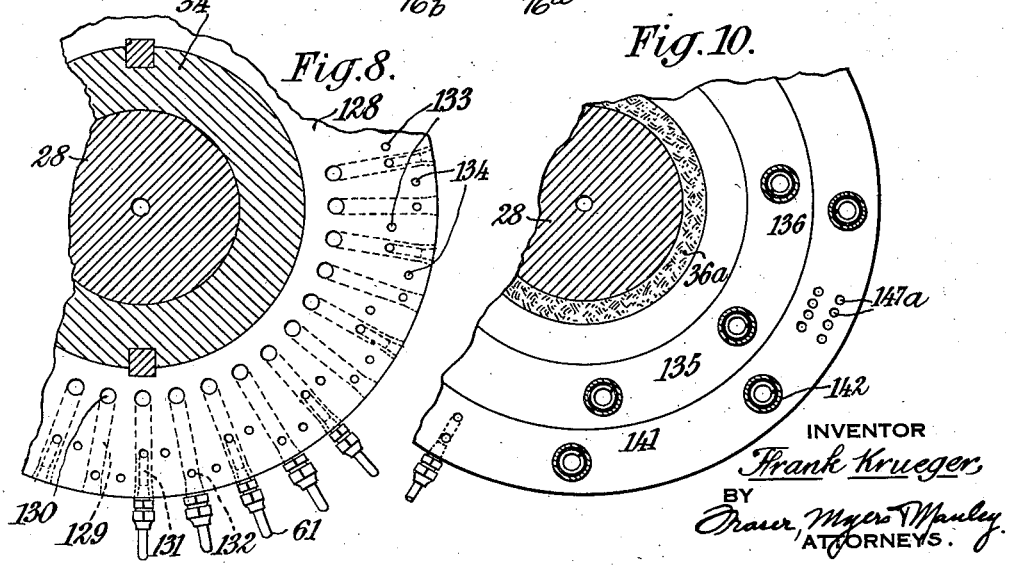
INVENTOR
Frank Krueger
BY
Mason, Myers & Manley
ATTORNEYS.

March 29, 1938.   F. KRUEGER   2,112,536
CAN TESTING MACHINE
Filed April 25, 1935   9 Sheets-Sheet 8
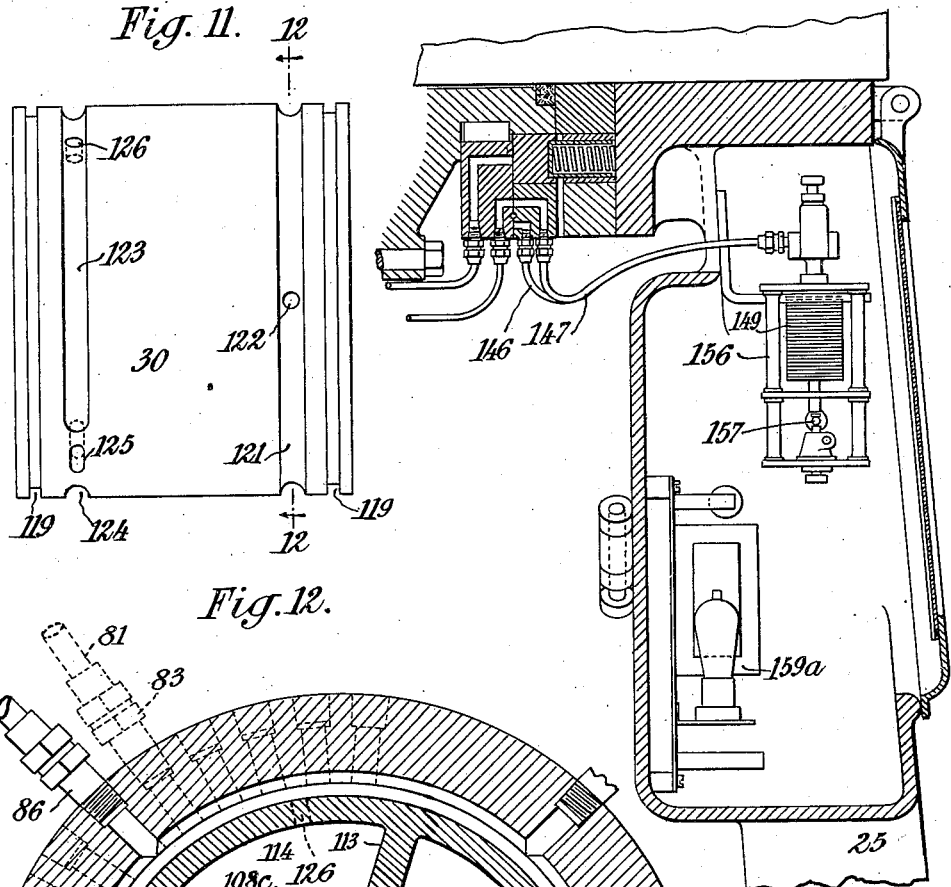
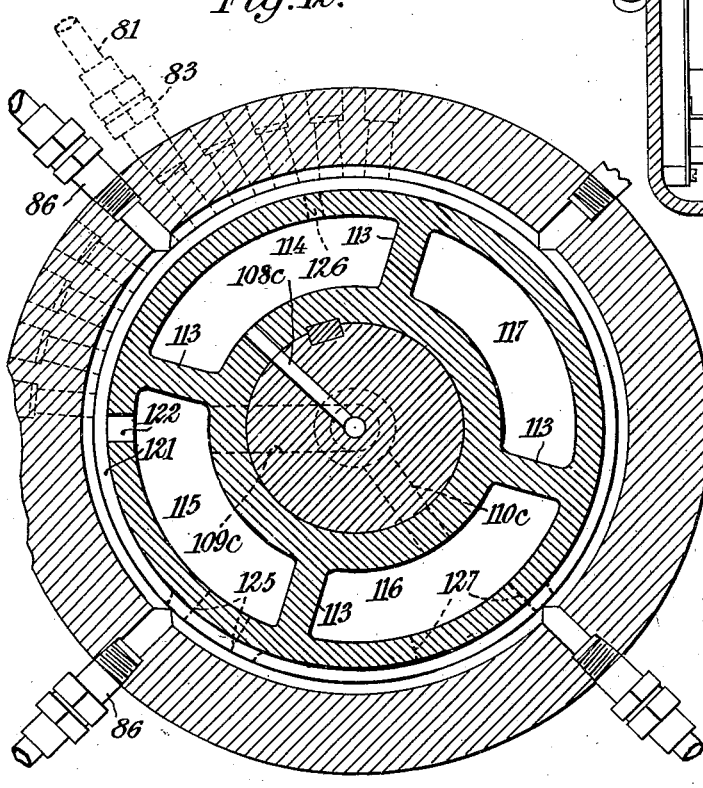
INVENTOR
Frank Krueger,
BY
ATTORNEYS.

March 29, 1938.  F. KRUEGER  2,112,536
CAN TESTING MACHINE
Filed April 25, 1935  9 Sheets-Sheet 9

INVENTOR
Frank Krueger,
BY
Drawer, Myers Manley
ATTORNEYS.

Patented Mar. 29, 1938

2,112,536

UNITED STATES PATENT OFFICE 2,112,536

CAN TESTING MACHINE

Frank Krueger, Brooklyn, N. Y., assignor to E. W. Bliss Company, Brooklyn, N. Y., a corporation of Delaware Application April 25, 1935, Serial No. 18,093

11 Claims. (Cl. 73—51)

My present invention relates to can testing machines and aims to provide certain improvements therein.

The primary object of my invention is to increase the speed and efficiency with which cans can be tested to detect leaks therein and to automatically separate the leaky cans from the sound ones. A further object is to provide a testing machine having a highly sensitive detector mechanism which will effectively detect so-called slow leaks in a minimum interval of time and thereby permit the rate of testing cans to be materially increased. A further object is to provide a machine of the character described wherein the machine can be readily adapted for testing cans of different size, shape and capacity with but slight modification of the operating mechanism. A further object is to provide means for insuring a proper sealing of the cans to be tested notwithstanding slight variations in their length or irregularities in the contour of their ends.

The foregoing and additional objects of my invention which will be apparent from the detailed description which follows, I accomplish by providing a can-testing machine in which the cans to be tested are, upon being fed to the machine, first truly centered to be properly received by the tester wheel, then initially held in position on the tester wheel by the operation of springs, after which they are clamped in position by a toggle action, and in turn, each can is enclosed by an hydraulically-controlled confining well or bucket-like member to provide a restricted air space around the can. The air within the restricted air space is then normalized, that is, brought to atmospheric pressure, and the interiors of the cans are then subjected to air pressure during almost a complete revolution of the tester wheel, and upon reaching the testing or leak-detecting station, alternate restricted air spaces around the cans are progressively placed in communication with a Sylphon and the other alternate restricted air spaces progressively placed in communication with a second Sylphon to speed up the testing operation. The Sylphons are each adapted upon receiving air from a restricted air space or chamber, due to a leaky can, to expand and thereby operate to close an electric circuit to set control or selector means for operating segregator means for separating the leaky cans from the sound ones.

The invention further consists in the several novel features of construction, arrangements and combinations of parts which will be hereinafter more fully set forth and claimed.

A preferred embodiment of my invention is illustrated in the accompanying drawings, wherein Fig. 1 is a side elevation of a machine embodying my invention.

Fig. 4a is a fractional view of a portion of the air valve unit and the pressure and detector air valves shown in Fig. 4, said section being taken along a radial plane different than that of Fig. 4.

Fig. 6 is a side elevation partly in section, showing the can-holding and can-enclosing parts of the machine.

Fig. 7 is a diametrical section, with parts in elevation, of the elements of Fig. 6, with the bucket-like can-enclosing element in can-enclosing relation.

Fig. 8 is a fractional section taken substantially along the plane of the line 8—8 of Fig. 4.

Fig. 9 is a side elevation of the can-clamping cam, parts thereof being in section to show the cam slide elements.

Fig. 10 is a fractional section taken substantially along the plane of the line 10—10 of Fig. 4.

Fig. 11 is a plan view of the hydraulic cylinder valve.

Fig. 12 is a section taken substantially along the plane of the line 12—12 of Fig. 11.

Fig. 13 is a plan development of the hydraulic cylinder valve shown in Fig. 11.

Fig. 14 is a radial section taken substantially along the same plane as that of Fig. 4, showing the detector mechanism which is normally disposed below the right hand end of Fig. 4.

Figure 1:
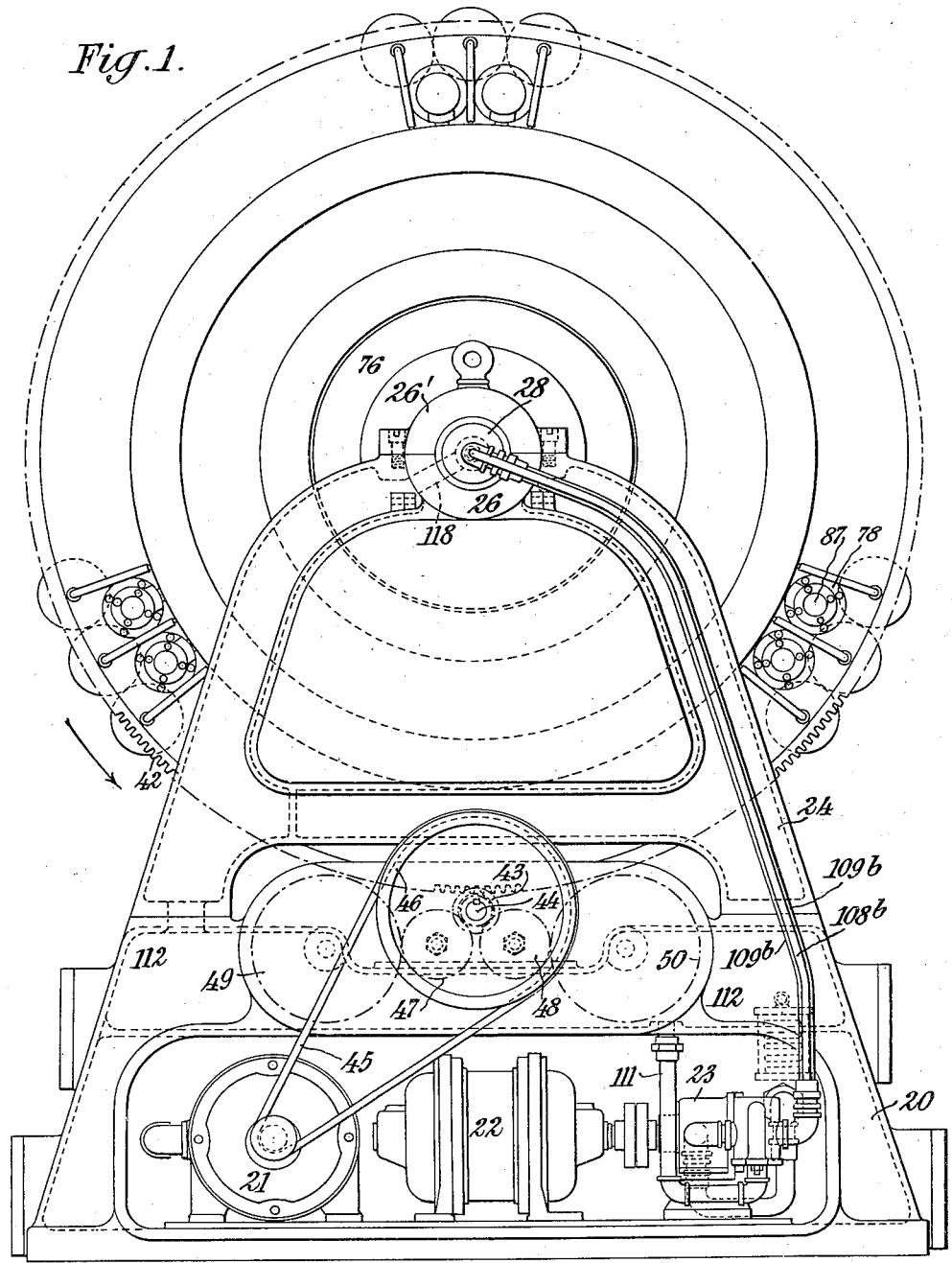
Figure 2:
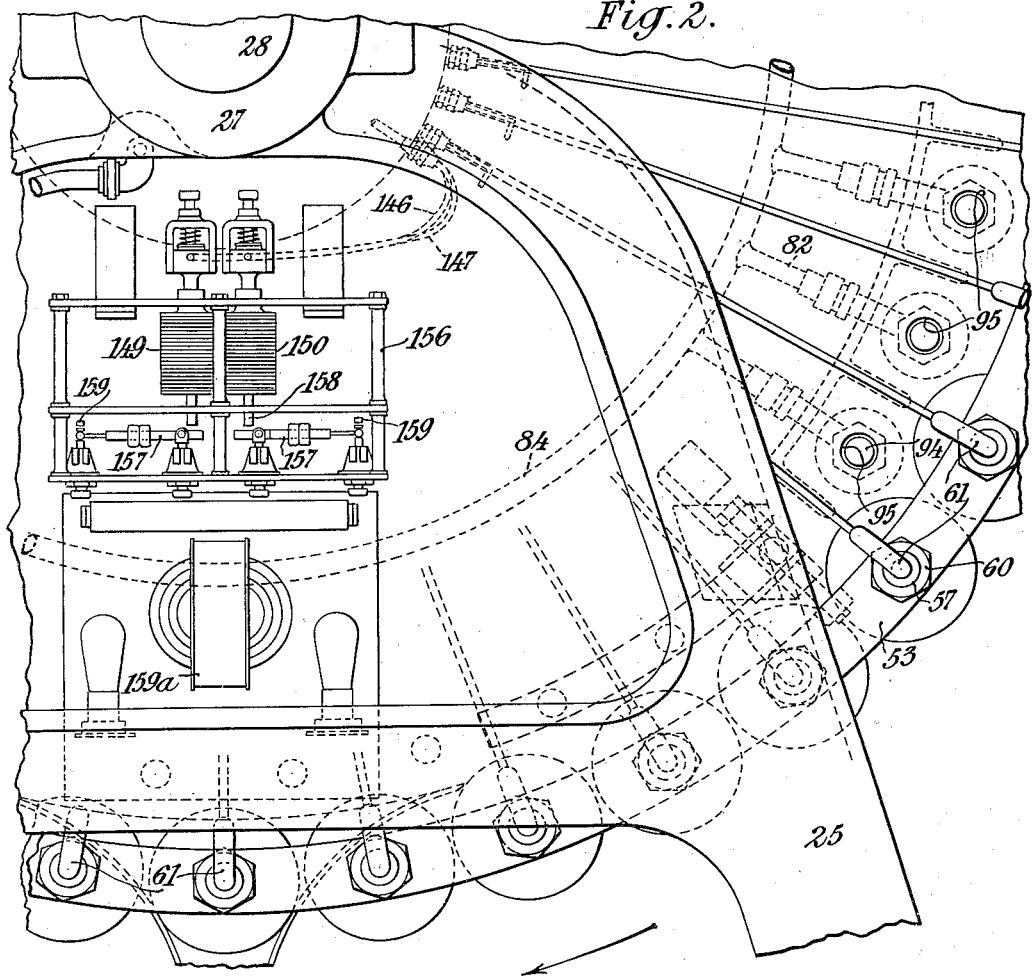
Fig. 2 is a fractional side elevation of the opposite side of the machine, on a somewhat larger scale than Fig. 1.
Figure 3:
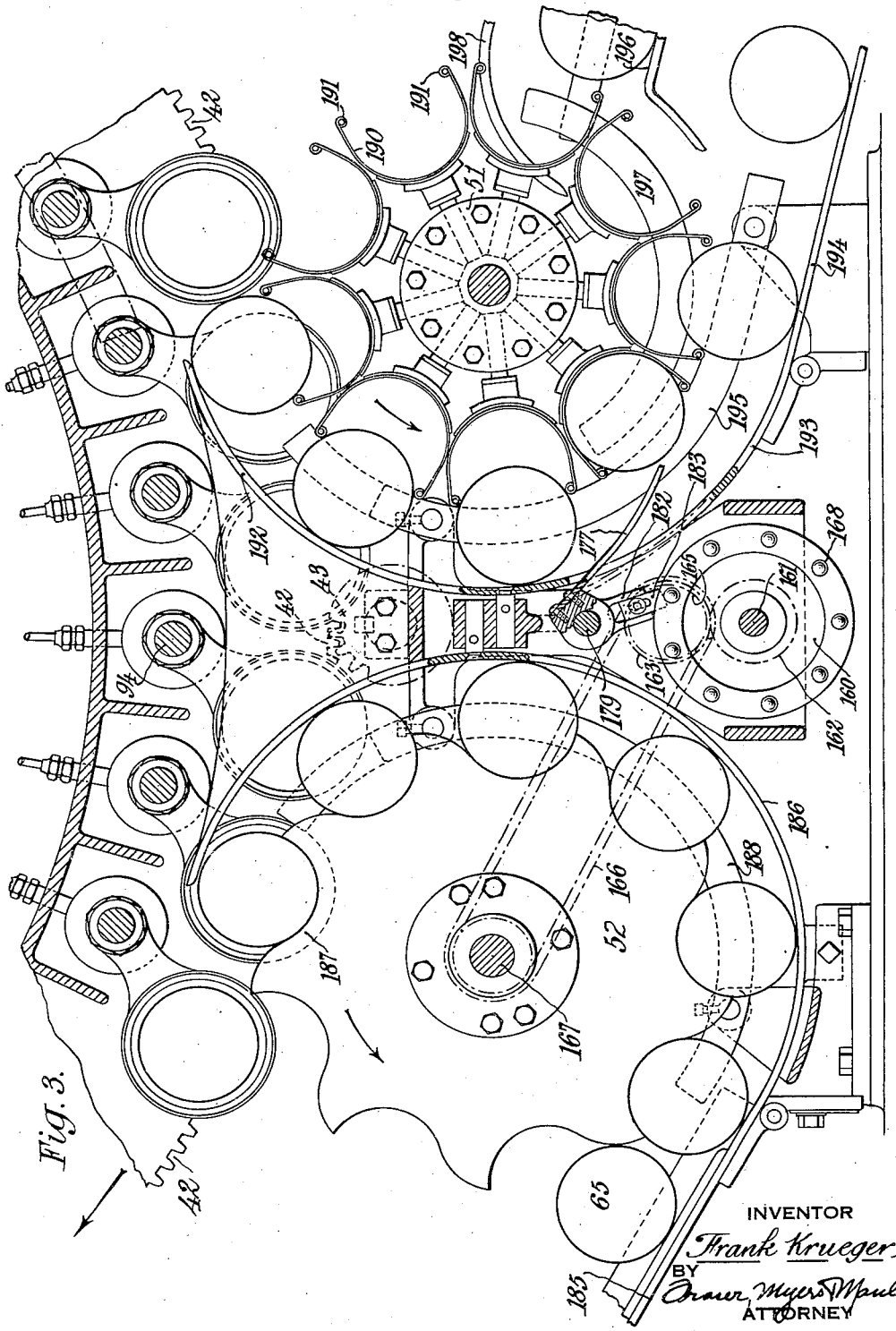
Fig. 3 is a sectional side elevation taken on the same side of the machine as Fig. 2 and below the portion shown therein, showing the can-charging, discharging and selector and segregator means of the machine, said section being taken substantially along the plane of the line 3—3 of Fig. 15.
Figure 4:
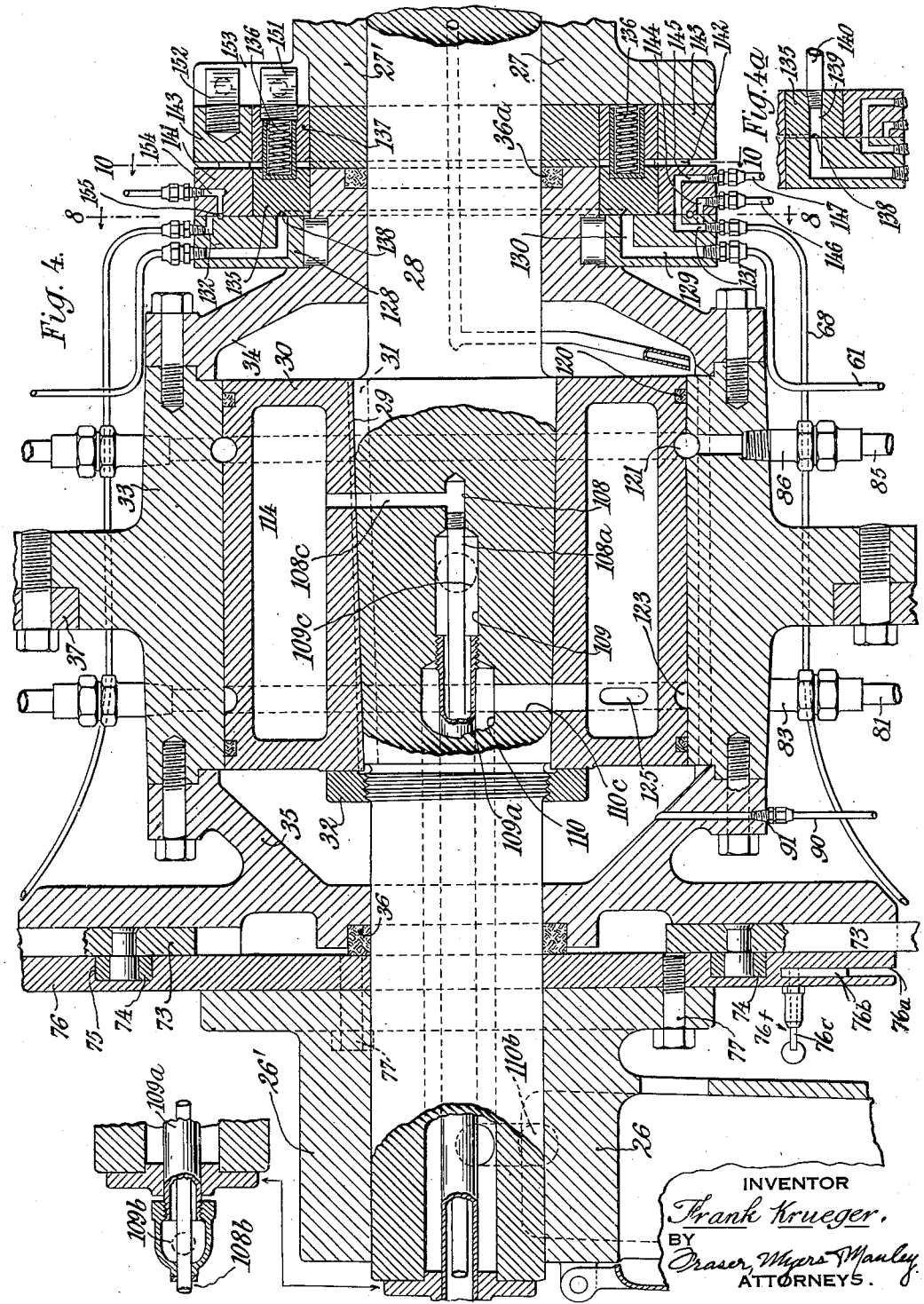
Fig. 4 is a diametrical section through the main shaft of the tester wheel, parts thereof being shown in elevation.

Referring first to Figs. 1 to 5 of the drawings, the reference numeral 20 indicates the base of the machine which is suitably formed with hollowed out portions on one side thereof to accommodate an electric motor 21 for driving the tester wheel and its appurtenant parts, a second motor 22 for driving a duplex oil pump 23 which controls the hydraulic pressure system of the machine and suitably hollowed out portions on its opposite side to accommodate the charging, discharging, selector and segregating mechanism which will be presently described.

Mounted on the base 20 are a pair of substantially triangular standards 24 and 25, which, at their tops, are provided with bearings 26 and 27, respectively, for supporting the tester wheel shaft 28. The bearings 26 and 27 are completed by cap bearing elements 26' and 27', respectively, which are suitably secured to the standard bearings.

The shaft 28, which is non-rotatable, is formed intermediate its ends with an enlarged, slightly tapered portion 29 on which is fixedly mounted an hydraulic cylinder valve 30 through the agency of a key 31 and a locking nut 32. The hydraulic cylinder valve is shown more in detail in Figs. 11, 12 and 13, and will be presently described.

Rotatably mounted upon the periphery of the hydraulic cylinder valve is a tester wheel hub 33, to one end face of which is secured an air valve hub 34 which rotatably engages the shaft 28, and to the other face of which is secured a cam slide gauge 35 which likewise rotatably engages the shaft 28. The valve hub 34 and cam slide gauge 35 are fitted with packing rings 36a and 36, respectively, in engagement with the shaft 28. Connected to the periphery of the tester wheel hub is a tester wheel which comprises a web plate 37 and an annulus 38 at the outer periphery thereof. The tester wheel annulus 38 is formed at its opposite ends with outwardly-directed flanges 39 and 40, and intermediate said ends with a flange 41, which flanges provide bearings for the can-receiving, can-holding and can-enclosing mechanisms. Supported at the outer peripheries of the flanges 39 and 41 is a gear 42 through which the tester wheel is driven. The gear 42 is in mesh with the main driving gear 43 mounted upon the main drive shaft 44, said shaft being driven by the motor 21 through the agency of a driving belt 45 and drive wheel 46 mounted on the shaft 44.

Also mounted on the main driving shaft 44 is a pinion which meshes with intermediate gears 47 and 48, which, in turn, drive the gears 49 and 50, respectively, on the shafts of which are mounted the charging star wheel 52 and discharge wheel 51, respectively.

The can-receiving, holding and enclosing means as units are radially disposed about the periphery of the annulus in equally spaced relation, and as herein shown, the tester wheel has thirty-six of these units. One of said units will now be described since all are the same.

Can-holding units

Figure 5:
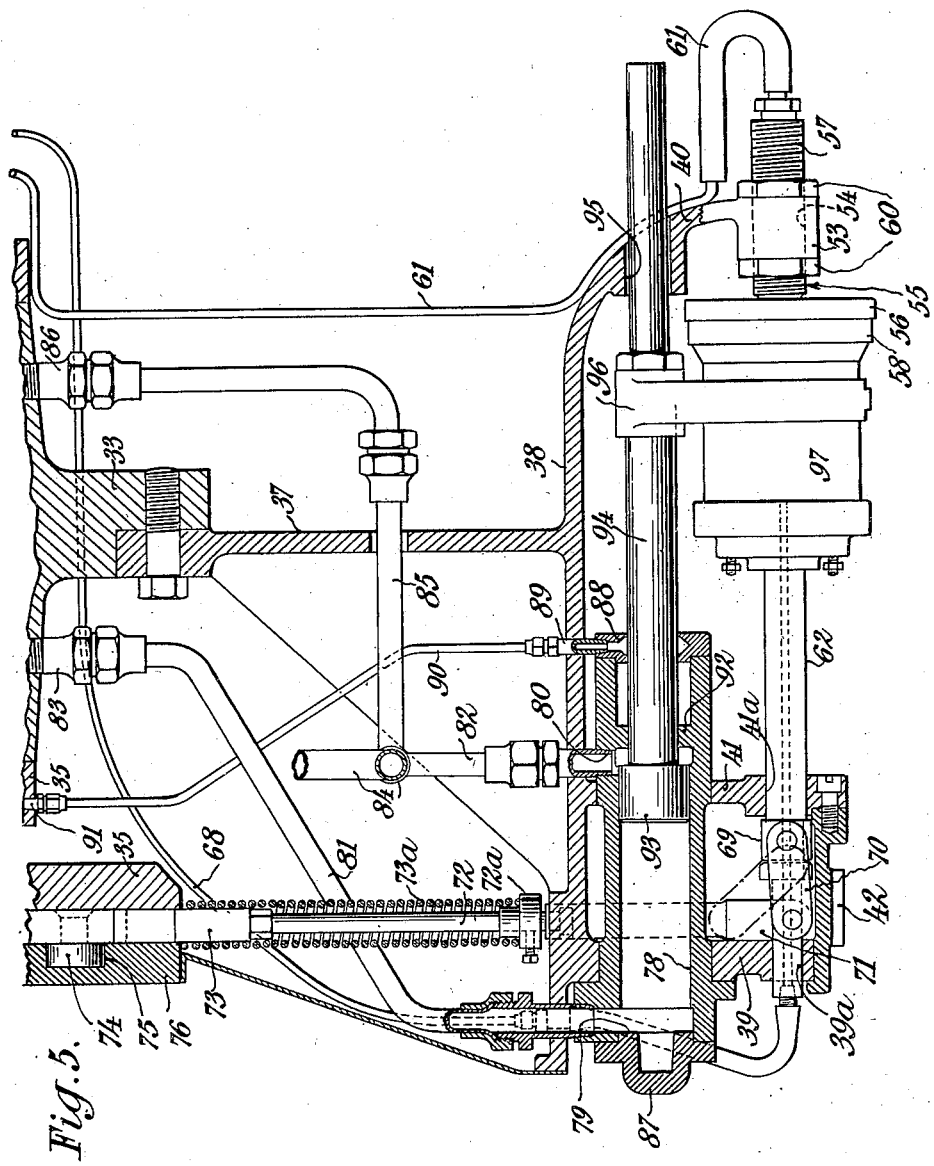
Fig. 5 is a radial section through the tester wheel showing a can-holding unit and the operative means therefor, parts of said figure being shown in elevation.

Referring to Figs. 5, 6 and 7, it will be seen that the flange 40 at its outermost periphery is thickened, as indicated at 53, and at radially spaced intervals is provided with screw-threaded openings 54 extending parallel to the wheel axis. Engaging in said openings are can-clamping supports 55 comprising a disk-like head 56 and a screw-threaded shank 57. Carried by the face of the head 56 is a relatively thick, compressible can-clamping packing 58, and extending completely through the packing and can-clamping support is a duct or charging opening 59. The can-clamping support is adjustable within the bearing provided by the thickened portion 53 through the medium of clamping nuts 60. Connected to the outer end of the screw-threaded shank 57 is a hose or pressure conduit 61 through which air under pressure may be charged into a can when clamped against the packing 58.

The flanges 39 and 41 have radially spaced openings 39a and 41a, respectively, therein in axial alignment with the openings 54 in the flange 40, and slidably engaging in said openings are clamp or tubular plunger rods 62, which, at their ends nearest the flange 40, carry a plunger head 63 having a flat bearing face 64 for engaging the closed end of a can 65. Extending across the bearing face of the plunger head are one or more radial or diametrical grooves 66, and on its opposite face the plunger head is formed with an annular rib 66a, the purpose for which will presently appear. The portions of the plunger rods between the flanges 39 and 41 are of reduced diameter and said rods between said flanges are each provided with a collar 69, to the diametrical opposite sides of which are pivotally connected a pair of toggle links 70, to the opposite ends of which are connected toggle forks 71. To the opposite ends of the toggle forks are connected radially disposed rods 72. Connected to the inner ends of the rods 72 are slides 73, which, at their inner ends, carry rollers 74 which engage in a cam groove 75 formed in the inner face of a cam plate 76. The rods 72 each carry an adjustable collar 72a and encircling each rod is a coil spring 73a, one end of which bears against the collar 72a and the other end against the peripheries of the cam plate 76 and cam slide gauge 35. The cam plate 76 is held in fixed position over the shaft 28 in engagement with the packing 36 by a plurality of bolts 77 which pass through a flange on the standard 24 and a flange on the bearing cap 26'. The cam plate 76 adjacent the can receiving station is peripherally slotted, as indicated at 76a and pivotally mounted in said slot is a cam backing plate 76b. Carried by said backing plate is a pin 76c which extends through a slot 76d which limits the pivotal movement of the plate. Normally, the plate 76b occupies its full line position shown in Fig. 9 due to the action of gravity thereon. The upper edge of the plate 76b has a cam surface 76e adapted to complete the cam track 75 when said plate is moved to its dotted line position shown in Fig. 9. To move said plate to said dotted line position, for example, when it is desired to turn over or reverse the movement of the machine the pin 76c is provided with a handle member 76f which may be grasped by the operator.

Mounted on the annulus 38 in radially offset relation to each of the can-clamping supporting means is a hydraulic cylinder 78 having ports 79 and 80, to which are connected through suitable fittings, conduits 81 and 82, respectively. The conduits 81 each connect with a tap-off fitting 83 extending radially through the hub 33, while the conduits 82 all connect with an annular conduit 84 which has four tap-offs 85 connecting with suitable fittings 86 extending radially through the hub in axially spaced relation to the tap-off fittings 83. The hydraulic cylinders 78 are closed at one end by imperforate heads 87, and at their other ends by heads 88 each having an axial opening therethrough and a hollow interior to which a tap-off fitting 89 is connected, said fitting 89 connecting with a conduit 90 which is connected to a fitting 91 in a wall of the cam slide member 35. Between the cylinder head 88 on the port 80 the hydraulic cylinders are each formed with an intermediate wall 92 which has an axial opening therethrough of the same diameter as the opening in the cylinder head 88. Mounted for reciprocation within each cylinder 78 is a piston 93 having a piston rod 94 which extends through a bearing opening 95 in the annulus flange 40. Mounted on the piston rod 94 so as to be movable therewith is a saddle 96 which carries a bucket-like member 97 of slightly larger internal diameter than the can 65 which it is adapted to enclose. The bucket-like member 97, as herein shown, comprises a cylindrical body portion 98, which, at its open end, is flared outwardly, as indicated at 99, and at its opposite end has screw-threadedly connected thereto a head 100. Clamped between the end of the body 98 and the head 100 is the peripheral edge of a flexible gasket 101 having a central opening of a diameter larger than that of the plunger rod 62. The head 100 has a plurality of openings 102 extending therethrough, said openings being equally spaced and concentrically disposed around the axis of said head and extending therethrough parallel to said axis. Said openings are counterbored on the inside of the head to provide chambers for housing coil-springs 103, said springs being disposed in encircling relation to pins 104, which, at their inner ends, are secured to a plate 105, and at their outer ends are screw-threaded and carry adjusting nuts 106. If desired, the flexible gasket 101 may be adhesively secured to the plate 105. It will thus be seen that the gasket 101 is held in floating relation within the bottom of the bucket-like member 97, and when the latter is disposed in can-encompassing relation the gasket 101, through means of the springs 103, provides an air-tight seal with the annular rib 66a on the plunger head 63. Because of the floating character of the packing 101, slight differences in the length of the cans and differences between the can seal and the enclosing member seal due to the independent means for moving said parts into sealing engagement with the sealing packing will be taken care of. The head 100 of the bucket-like member 97 also has a central opening 107 therethrough which permits of relative movement and clearance of the member 97 with respect to the plunger rod 62. The movements of the bucket-like member 97 through the reciprocation of the plunger 93 will be presently explained.

*Hydraulic cylinder valve and hydraulic piston operation*

Referring now to Figs. 1, 4, 5, 11, 12 and 13, it will be seen that the tester wheel shaft 28 is axially bored from one end to provide bores of different diameters, as follows: 108 of smallest diameter, 109 of somewhat larger diameter and 110 of still larger diameter. Screw-threadedly connected within the bores 108 and 109 are pipes or conduits 108a and 109a, respectively. The pipe 108a extends through the end of the shaft and connects through a conduit 108b to the high pressure pump of the duplex pump 23, while the pipe 109a likewise extends through the end of the shaft, and through a pipe 109b connects with the low pressure pump of the duplex pump 23. The suction side of the duplex pump 23 connects through a conduit 111 with an oil chamber or sump 112 formed in the base 20.

The hydraulic cylinder 30 consists of a hollow annulus having four radial partitions 113 which divides the interior of the annulus into four chambers 114, 115, 116, and 117. The chamber 114 is the high pressure chamber and at its inner periphery has a port which establishes communication through a duct 108c with the high pressure bore 108. The chamber 115 is a low pressure chamber, and at its inner periphery has a port which communicates with a duct 109c leading from the bore 109. 116 is a discharge chamber, and at its inner periphery has a port which communicates with a duct 110c leading to the bore 110. 117 is primarily a balancing chamber but may communicate with either chambers 114 or 116, if desired. The bore 110 has a discharge port 110b which communicates with a duct 118 in the bearing of the standarl 24, which duct discharges into the oil chamber 112.

The hydraulic cylinder valve 30 on its outer periphery is formed with annular grooves 119 for receiving packing rings 120 and with an annular recess or groove 121 having a radial opening 122 leading therefrom and connecting with the low pressure chamber 115. In axially spaced relation to the groove 121 the hydraulic cylinder valve has two annularly-extending grooves 123 and 124 and a port 125, the center line of said grooves and port all lying in the same plane. The groove 123 extends around the periphery for the major portion of its circumference and has an opening 126 for establishing communication between said groove and the high pressure chamber 114. The groove 124 has an opening 127 therein for establishing communication between said groove and the discharge chamber 116, while the port 125 leads to the low pressure chamber 115.

In the operation of the hydraulic plungers 93 in the cylinders 78 it will be appreciated that said cylinders being carried on the tester wheel are rotatable therewith around the hydraulic cylinder valve 30, which is stationary, and that the fittings 83 and 86 which connect with the cylinders 78 will establish communication with the respective chambers of the valve 30 through the ports therein which lead to the outer periphery of the valve. By the operation of the duplex pump 23, hydraulic fluid, such as oil under low pressure, will be constantly pumped into the low pressure chamber 115 from the sump 112, and oil under high pressure will be maintained in the high pressure chamber 114. Normally the conduits 85 are in constant communication with the low pressure chamber and hence maintain the low pressure in the right hand end of the cylinders 78. The intake port 125 also communicates with the low pressure chamber, hence, as an opening in the hub leading to a fitting 83 which connects with a conduit 81 connecting with the left hand end of the cylinder 78, passes over the intake port 125, low pressure oil will be charged into said left hand end of the cylinder, and as the area of the piston thus acted upon is substantially greater than its opposite face, the piston will move to the right and carry with it the bucket-like member 97 to bring it into hermetic sealing relation with the packing 58. As the wheel passes over the intake port, the opening leading to the fitting 83 establishes communication with the high pressure chamber 114 and thus subjects the left hand side of the cylinder to high pressure fluid and insures the piston being held in its extreme right hand position and the maintenance of an hermetic seal with the packing 58 so long as the fitting 83 remains in communication with the high pressure groove of the valve 30. After passing over the high pressure groove the fitting 83 establishes communication with the discharge port, thereby relieving the pressure from the left hand face of the plunger 93, whereupon the low pressure constantly acting on the right hand face thereof will move the piston and the bucket-like member 97 to the left, discharging the oil from the cylinder 78 into the discharge chamber of the valve, from which it passes through duct 110c into bore 110 of the tester wheel shaft and from thence through duct 110b down through the frame of the standard into the sump 112. It will be appreciated that this series of operations are repeated in properly timed relation to the clamping of the can against the packing 58 by the plunger 62, which operations are controlled by the cam groove 75. Any oil which seeps past the partition wall 92 along the piston rod 94 will in due course find its way into the hollow head 88 and from there through the conduit 90 into the chamber formed by the tester wheel shaft 28, hydraulic cylinder valve 30, and cam slide gauge 35, and from there to the sump 112 through a conduit (not shown).

*Air valve unit (pressure and detector)*

Referring now to Figs. 4, 4a, 8 and 10, we find keyed upon the air valve hub 34 so as to be rotatable therewith as a unit, an annulus or ring 128 having radial ducts 129 each connected through a suitable fitting with the pressure conduit 61 leading to the interior of the shank of the can-clamping support 55. Each of said radial ducts 129 connects with an axial port or duct 130 leading to the right hand face of the ring 128. In axially spaced relation to the radial ducts 129, the ring 128 is formed with two groups of radial ducts 131 and 132 of different length, the ducts 131 of one group being longer and arranged in alternate relation to the shorter ducts 132. Each of said radial ducts 131 and 132 has an axial opening leading to the right hand face of the ring, thus providing two concentric rings of radially spaced openings or ports, the openings in one ring alternating with the openings in the other ring. The radial ducts 131 and 132 are connected through suitable fittings to the leak-detector conduits 68 which connect with the passages through the plunger rods 62 which communicate with the space within the bucket-like member 98 around a can through the radial grooves 66. In radially spaced relation to each of the axial components of the ducts 131 and 132 and circumferentially rearwardly of said ports in the direction of rotation of ring 128, said ring has vent openings 133 and 134, respectively, extending completely therethrough, said openings being divided into two groups, the openings of one group alternating with those of the other.

Mounted upon the periphery of the air valve hub 34 but held against rotation therewith is an annulus or ring 135 which is held in spring-pressing contact with the right hand face of the ring 128 by a plurality of circumferentially spaced spring units 136 carried by a pressure ring 137. On its left hand face, said ring is provided with a circular groove or recess 138 extending about 290° around the circumference, and leading to said groove is an opening 139 through said ring parallel to the ring axis and connecting with a pipe 140 leading from a source of air pressure.

Mounted upon the outer periphery of the ring 135 is a ring 141 which is held in non-rotary, spring-pressed relation with the ring 128 by means of a plurality of circumferentially spaced spring units 142 mounted in a ring 143. The ring 141 has a pair of axially spaced radial ducts 144 and 145 extending inwardly from its periphery, said ducts having axial components which are adapted to establish communication with the axial components of the ducts 131 and 132 in the ring 128 as said ducts in said ring pass the ducts in the ring 141. Of course the ducts 144 and 145 will also establish communication with the openings 134 and 133, respectively, in the ring 128 as said ring rotates relatively to ring 141. The ring 141 also has a plurality of openings 141a extending therethrough and likewise adapted to establish communication with the axial openings of the ducts 131, 132, 133 and 134, for a purpose which will presently appear. Connected to said ducts 144 and 145 by suitable fittings are a pair of pipes or conduits 146 and 147, respectively, which lead to a pair of Sylphons 149 and 150, respectively. The annular pressure rings 137 and 143 are held against rotation by projecting square-headed shanks on screws 151 and 152, respectively, which are disposed between a pair of upstanding shoulders 153 provided in the cover bearing 27' and through which set screws (not shown) extend to bear against the opposite faces of the square-headed shanks on the screws 151 and 152. To lubricate the contacting surfaces between the ring 128 and the detector ring 141, the latter may be provided with a lubricating duct 154 which leads to an annular recess 155 in the face of said ring which contacts with ring 128.

The Sylphons 149 and 150 are mounted upon a suitable support 156 upon which is also mounted a pair of pivoted levers 157 adapted to be engaged by the depending elements 158 of the Sylphons when the latter are elongated by the admission of air therein from a leaky can. The pivoted levers 157 are adapted to carry a minute electric current and to close an electric circuit through contacts 159 when moved about their pivots by the Sylphon projections 158 and to operate through a "Micro-troller" set 159a or other suitable current-amplifying means to set a selector mechanism, which, in turn, operates a suitable segregator for separating the leaky cans from the sound ones.

Figure 15:
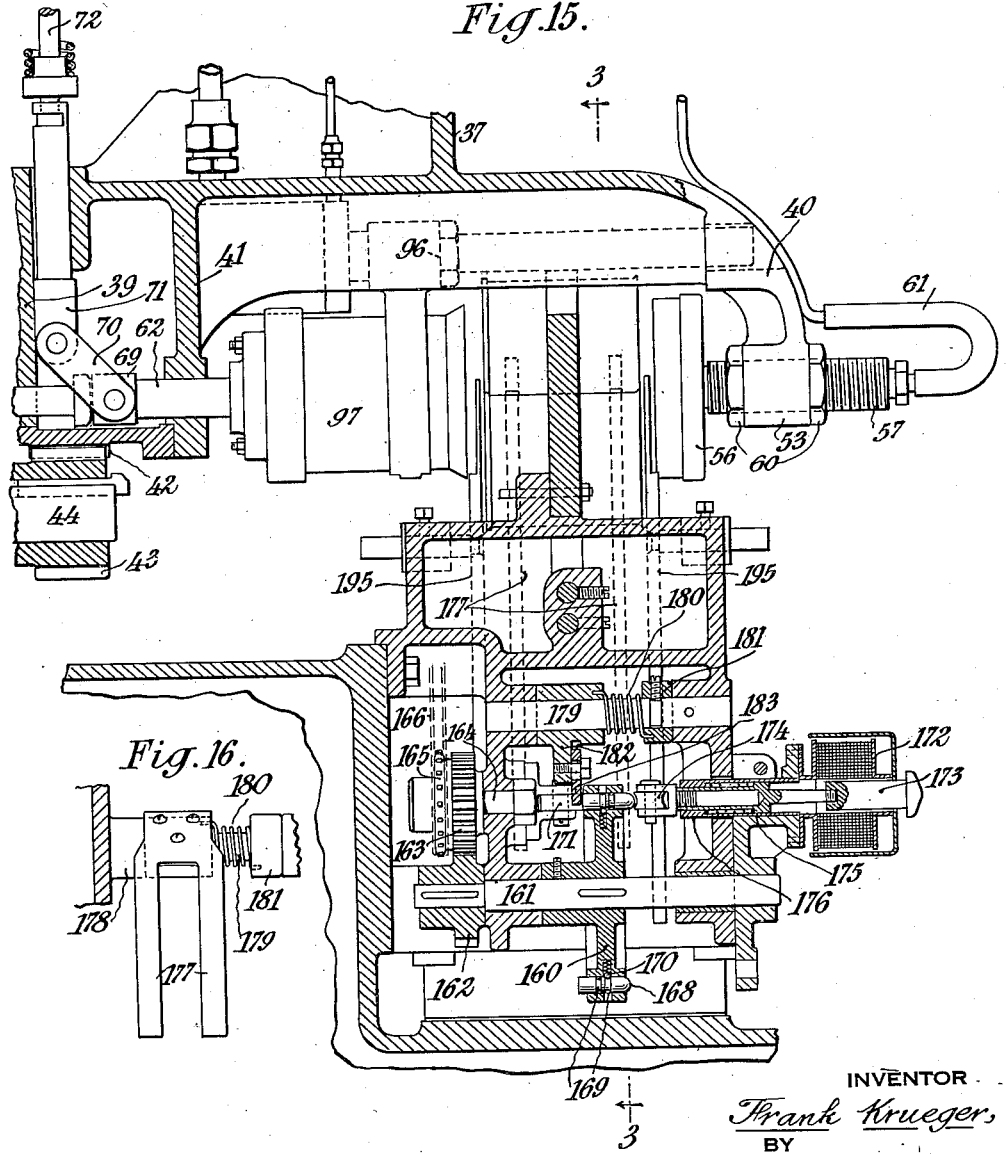
Fig. 15 is a radial section with parts in elevation, showing the leaky can selector and segregator mechanism.
Figure 16:
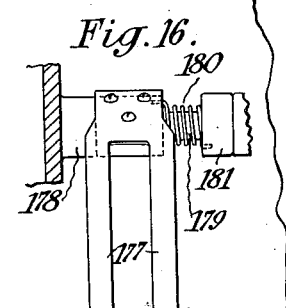
Fig. 16 is a side elevation of the can segregator.

The selector mechanism as herein disclosed consists of a pin wheel 160 having mounted thereon in radially spaced, axially-disposed relation adjacent its periphery, nine slidable pins 168 adapted to be set into segregator activating position by a solenoid 172. The pin wheel 160 is mounted upon a shaft 161 which is driven through a gear 162 thereon in mesh with a gear 163 mounted upon a stud shaft 164, upon which shaft is also mounted a sprocket wheel 165 over which is trained a sprocket chain 166 which engages over a sprocket wheel mounted on a shaft 167, upon which the star wheel 52 is also mounted. The driving connection between the shaft 167 and the shaft 161 is such as to rotate the pin wheel 160 in synchronous timed relation to the tester wheel and the discharge wheel. Each of the pins 168 on the wheel 160 has a pair of axially spaced circumferential grooves 169 adapted to cooperate with a spring-pressed pawl detent 170 and to be normally held with their noses projecting from the right hand face of the wheel 160, as viewed in Fig. 15. To insure such normal position or a resetting to such position of the pins there is provided a roller 171 which is adapted to engage the rear end of said pins when projecting from the left hand face of the wheel 160 after they have operated to set the segregator into activating position.

When, due to elongation or expansion of either of the Sylphons the electric circuit is closed through the contact 159, the current in said circuit is amplified by the "Micro-troller" set and is passed through the solenoid 172 to move the core 173 thereof to the left. Said core at its left hand end carries a roller 174, which, upon engaging the nose of a pin 168, will move the same to cause its rear end to project from the ring 160. After the pin has thus been set and the solenoid de-energized due to the breaking of the electric circuit therethrough, the core is returned to its normal position by means of a spring 175 mounted within a bearing 176 within which the solenoid core is movable. It will be understood that the position of any pin 168 on the wheel 160 which is set by the solenoid is moving in synchronous relation to the can on the tester wheel and the movement of the discharge wheel, so that when the set pin reaches the segregator to activate the same, the can from the tester wheel will reach the position on the discharge wheel whereat the segregator acts to be separated from the sound cans.

The segregator as herein shown comprises a forked member 177 mounted on a hub 178 adapted to swing about a shaft 179 and is normally held in its inactive position by a torsion spring 180, one end of which is fixed to the hub 178 and the other end of which is fixed to a collar 181 fast on the segregator shaft 179. The hub 178 has an offset 182 having a slideway therein within which is adjustably mounted a lug 183 which projects downwardly into the path of the rear ends of the wheel pins 168, so that when a set pin, that is, one which has its rear end projecting from the wheel, encounters the lug 183, it moves the same in the path of rotation, in the course of which movement the segregator hub is rotated upon its shaft against the torsion of the spring 180 to set the segregator 177 into the full line position shown in Fig. 3. In said position the segregator will encounter the leaky can and force it into the spring supports or out of the path which the sound cans take. After this is accomplished the pin 168 will have passed beyond the segregator lug 183, whereupon the torsion spring 180 will return the segregator to its normal position and the roller 171 will reset the pin to normal position.

For feeding the cans to the tester wheel any well known means may be employed, and as herein shown, said means comprises a slideway 185 down which the cans may roll, whereupon they are picked up by the peripheral grooves of the star wheel 52 and carried around in cooperation with a guide rail 186 to the can-clamping station 187. Before reaching said station the cans are truly centered by said star wheel and guide rail between a pair of end rails 188 so that the can will properly engage and be clamped against the packing 58.

The discharge wheel 51 has nine spokes, upon the outer ends of which are mounted can mould spring supports 190 of substantially U-shape configuration, each spring having its free ends turned inwardly to provide beads 191. The U-shape configuration of the spring supports is somewhat greater than a semi-circle, and at their open ends are of a normal size less than the diameter of a can to support such can in cooperation with a stripper 192 as it is stripped thereby from the tester wheel. The dimension and configuration of the spring supports 190 are of a size to permit a spring-supported can to be forced by the segregator 177 down into the support past its beaded ends 191 to be held thereby. The stripper is substantially concentric with the discharge wheel 51 and its prolongation constitutes a guide rail 193, the lower extremity 194 of which constitutes a discharge slide. End guides 195 are provided for guiding the cans in their movement toward the discharge end of the chute 194.

When the segregator 177 is moved into position to segregate a leaky can from the others it acts as a presser, and as the can engages said segregator arms 177 it is pressed or forced up between the arms of a spring support 190 and is carried thereby to a secondary discharge chute 196. Supplemental end guides 197 serve to hold the can within the spring supports until engaged by an ejector stripper 198.

It will be observed that the number of can spring supports on the discharge wheel corresponds with the number of pins 168 on the selector wheel 160, and that the rotation of the discharge wheel and selector wheel are synchronous. Hence the detector point on the tester wheel must be so chosen that the solenoid 172 will set a pin 168 on the wheel 160 to operate the segregator 177 when the leaky can reaches the segregator can-engaging station.

Operation

In the operation of my can testing machines, cans 65 are continuously fed down the slide 185, are picked up by the star wheel 52, properly centered thereon, and upon reaching the station 187, which corresponds to the point 200 on the cam groove 75, a cam slide 73 will be moved radially outwardly by the action of the spring 73a thereon down against the cam locking plate 76b to move the plunger head 63 to hold the can against the packing 58. As the cam roller 74 of the slide in moving over the surface 76e of the cam backing plate reaches the point 201, it locks the toggle connections 70, 71, to positively clamp the plunger head into can-clamping engagement. After this is accomplished the piston 93 moves the bucket-like member 97 into can-enclosing relation against the packing 58 and the bucket is then normalized, that is, brought to atmospheric pressure, by relieving any excess pressure which may have been formed in said restricted space due to the compression action of the member 97 against the packing 58. This normalizing action is accomplished as the openings 147a of the pressure ring are brought into communication with the ducts 131 and 132 of the ring 129. Air under pressure is then charged into the interior of the can and maintained therein until the detector station is reached.

When a can reaches the detector station the ducts 145 and 144 of the detector ring alternately establish communication with the ducts 132 and 131, respectively, to carry any air under pressure from within the restricted air spaces around a can 65 which has passed through the grooves 66 into hollow plunger rods 62 then through ducts 61 to the Sylphons 149 and 150, respectively, to operate the selector mechanism for setting the segregator 177. Immediately after the establishment of such communication the ducts 145 and 144 establish communication with the vent openings 134 and 133, respectively, to vent the pressure from the Sylphons to atmosphere.

Immediately after leaving the testing station the bucket members 97 are retracted, as is also the plunger 63, as the can is stripped from the tester wheel and held in guiding relation between said stripper and a spring support. A leaky can will be engaged by the segregator 177 upon reaching the segregator station to be pushed up into the spring support to be discharged over the chute 196, whereas the sound cans will move along the guide rail 193 and be released by the spring supports upon reaching the discharge chute 194.

The tester wheel having 36 can-holding stations and rotating at a speed of eight and one-third revolutions per minute, can test three hundred cans per minute. This leaves but one-fifth of a second for a complete testing operation, that is to say, for subjecting the air from a leaky can to the Sylphon, causing the same to elongate and close the electric circuit to set the selector pin and to vent the Sylphon to atmosphere so as to render it ready for the next testing operation. However, as the time interval is so short, by providing two Sylphons as hereinbefore described, and subjecting each Sylphon to the air pressure, if any, in alternate restricted can-enclosing spaces, the time interval for conducting the test in each Sylphon is doubled. It will be appreciated that if desirable, a larger number of Sylphon-testing devices may be employed with a corresponding modification in the take-offs or test leads from the can enclosures. It will also be appreciated that the constructions and arrangements of the charging and discharging wheels together with their attendant slides, guides, strippers, etc., are such as to permit of ready change or substitution so as to render the machine capable for use with cans of different sizes.

From the foregoing detailed description it will be appreciated that I have provided a can-testing machine adapted for testing cans at high speed and great efficiency, and although I have shown and described a single embodiment of my invention I do not wish to be limited to the details of construction disclosed, since it will be apparent that these may be varied within the range of engineering skill without departing from the spirit of the invention as defined by the appended claims.

What I claim is:

1. A can testing machine comprising a can sealing packing, a can plunger for holding the open end of a can against said packing, a member for enclosing a can that is held by the plunger, said member being adapted to engage the sealing packing and provide a restricted air space around the held can, and a floating packing in said member adapted to provide a hermetic seal with the can plunger.

2. A can testing machine comprising a can sealing packing, a can plunger for holding the open end of a can against said packing, said plunger having on its face opposite to that which engages the can an annular rib, a member for enclosing a can that is held by the plunger, said member being adapted to enclose the can and provide an hermetically sealed restricted air space around the held can, and a resiliently mounted packing in said can enclosing member for providing an hermetic seal with the annular rib on the can plunger.

3. A can testing machine comprising a can sealing packing, a can plunger having a head for holding the open end of a can against said packing, means for moving said plunger into can holding relation, a member for enclosing a can that is held by the plunger, said member being adapted to engage the sealing packing and provide a restricted air space around the held can, means for moving said member into can enclosing and sealing packing engaging relation, and a floating packing between the plunger head and the can enclosing member for providing an hermetic seal between said head and member and take care of differences between the can seal and can enclosing member seal brought about by the independent means for moving said parts into sealing engagement with the sealing packing.

4. A can testing machine comprising a can sealing packing, a can plunger having a head for holding the open end of a can against said packing, mechanically operable means for moving said plunger into can holding relation, a member for enclosing a can that is held by said plunger, said member being adapted to engage the sealing packing and provide a restricted air space around the held can, hydraulically operable means for moving said member into can enclosing and sealing packing engaging relation, and a floating packing between the plunger head and the can enclosing member for providing an hermetic seal between said head and member.

5. A can testing machine comprising a can sealing packing having an opening therethrough, a support for said packing having a passage therethrough in communication with the opening through the packing, a can plunger for holding a can with its open end in sealing engagement with said packing, a bucket-like member for enclosing a can that is held by the plunger, said bucket-like member being coaxially mounted with the plunger and adapted to engage the sealing packing and provide a restricted air space around the held can, a packing in the bucket-like member adapted to provide an hermetic seal with the face of the plunger opposite to that which engages the can, the opening in the packing communicating with the interior of the can, and said plunger having passages therein communicating with the restricted air space between the can and the can enclosing member.

6. A machine of the character described comprising a shaft, a rotatable testing wheel mounted on said shaft having a plurality of radially spaced can receiving and holding means, bucket-like members for enclosing a held can to provide a restricted air space therearound, hydraulic means comprising a cylinder and a ram movable therein for moving each bucket-like member into can enclosing relation under the action of hydraulic pressure which is maintained against the ram throughout the testing operation, each ram having a differential piston on the opposite sides of which the hydraulic pressure normally acts during the testing operation, at the end of which operation the pressure acting on the piston side of larger area is released to cause the hydraulic ram to move the bucket-like member into inoperative position.

7. A machine according to claim 6, having a stationary hydraulic valve mounted on the tester wheel shaft and with relation to which the tester wheel revolves to establish communication with the hydraulic ram cylinders.

8. A machine according to claim 6, having a stationary hydraulic valve mounted on the tester wheel shaft, said valve comprising an annulus having a plurality of chambers in communication with a pumping system and a plurality of ducts leading to the periphery of the annulus, and with relation to which the tester wheel revolves to establish communication with the hydraulic ram cylinders.

9. A machine of the character described, comprising a rotatable tester wheel having a plurality of radially spaced can-receiving and holding means, a discharge wheel for receiving the cans from the tester wheel, a discharge stripper chute cooperating with said discharge wheel, yieldable means on said discharge wheel cooperating with the discharge chute to strip the cans from the tester wheel, means for detecting leaky cans, a selector adapted to be set by the leak detector means, and a segregator operable by the selector for forcing the leaky cans into gripping engagement with the yieldable means for separating leaky cans from the sound ones.

10. A machine according to claim 9, wherein the yieldable means are U-shaped springs between the arms of which the cans are adapted to be forced by the segregator.

11. A machine of the character described, comprising a rotatable tester wheel having a plurality of radially spaced can-receiving and holding means, a discharge wheel for receiving the cans from the tester wheel, means for detecting leaky cans, a segregator comprising a pivotally mounted element which is normally held out of the path of the cans carried by the discharge wheel and adapted to be moved into said path, a selector wheel having settable elements radially spaced therearound and means for rotating the tester wheel, the discharge wheel and the selector wheel in synchronous relation, and electrical means operable by the leak-detecting means for setting the settable elements of the selector wheel to move the pivotally mounted element of the segregator about its pivotal mounting into the path of the cans carried by the discharge wheel to separate leaky cans from the sound ones.

FRANK KRUEGER.